United States Patent [19]

Schellmann

[11] Patent Number: 4,648,309
[45] Date of Patent: Mar. 10, 1987

[54] LIGHT ALLOY PISTON

[75] Inventor: Klaus Schellmann, Weinsberg, Fed. Rep. of Germany

[73] Assignee: Kolbenschmidt AG, Neckarsulm, Fed. Rep. of Germany

[21] Appl. No.: 733,552

[22] Filed: May 13, 1985

[30] Foreign Application Priority Data

May 18, 1984 [DE] Fed. Rep. of Germany ....... 3418454

[51] Int. Cl.$^4$ ............................................... F16J 1/04
[52] U.S. Cl. ........................................ 92/233; 92/177; 123/193 P
[58] Field of Search ........... 92/177, 209, 239, DIG. 1, 92/DIG. 2, 233, 158; 123/193 P

[56] References Cited

U.S. PATENT DOCUMENTS

| 1,758,444 | 5/1930 | Jehle et al. | 92/233 X |
| 2,513,814 | 7/1950 | Moore | 92/233 |
| 4,535,682 | 8/1985 | Collyear et al. | 123/193 P |

Primary Examiner—Stephen F. Husar
Attorney, Agent, or Firm—Sprung Horn Kramer & Woods

[57] ABSTRACT

In a light alloy piston having a convex and oval external shape, the piston skirt has in the cold state a larger running clearance at its top end than at its bottom end. In order to reduce the friction loss of such piston, the piston skirt has a larger ovalness adjacent to the horizontal plane extending through the pin axis than in the remaining regions of the piston skirt.

1 Claim, 3 Drawing Figures

LIGHT ALLOY PISTON

BACKGROUND OF THE INVENTION

This invention relates to a light alloy piston for internal combustion engines, which piston has a convex and oval external shape and comprises a skirt which in the cold state has a larger running clearance at its top end than at its bottom end.

Almost all light alloy pistons for modern internal combustion engines have a machined, profiled sliding surface, which is consistent with the thermal and mechanical conditions arising during the operation of the engine. For this reason pistons of all sizes and designs have a large number of different convex and oval external shapes, which are intended to minimize the running clearance and to ensure that the proportion of the surface in which the piston skirt contacts the cylinder in the sliding plane, so as to transmit load, will be as large as possible whereas the seizure-proofness is not adversely affected. In the cold, the piston has a convex shape because the generatrices of the skirt are curved. This is desired to ensure that the temperature pattern along the piston skirt will match the expansion resulting from said temperatures. The resulting curvature can be described as a sliding curve and in most cases is strongly recessed at the top end of the piston skirt because the temperatures are relatively high there during the operation of the engine and because good lubricating conditions involving the formation of a lubricating wedge are desired. The curve is only slightly curved in the middle and owing to the lubricating conditions may again be slightly recessed or straight at the bottom end of the skirt.

The ovalness of the piston has a minor half-axis having the same direction as the pin axis. In many pistons the ovalness is larger at the top end of the piston skirt than at its lower end and the two ovalnesses merge continuously into each other. The ovalness of the piston may be constant. Owing to the ovalness of the piston skirt the temperature-induced increase in the volume and girth of the light alloy piston are deflected toward the direction of the pin axis and skirt deformations caused by the force exerted on the sliding surface will be taken up. In that case the piston skirt must have an ovalness reserve even when it is fully stressed during the operation of the engine. Owing to the pivotal movement of the connecting rod and the variable force which is exerted on the sliding surface and is introduced at right angles to the piston axis and is due to the resolution of the gas force, the light alloy piston carries load during the operation of the engine substantially in the regions which are on opposite sides of the plane which includes the piston axis and the direction that is at right angles to the piston axis (pressure side-backpressure side). In said regions the presence of a hydrodynamic lubricating film is not ensured throughout the stroke of the piston so that there will be mixed friction between the piston and the sliding surface of the cylinder close to the dead centers. This results in the formation of bearing patterns which have parabolic lateral boundary lines and extend on the skirt on both sides of that plane over a region of up to 45° on each half of the piston skirt. When the piston is designed in consideration of these aspects, it is desired to ensure a contact of the sliding surface of the cylinder with the piston on an area which is as large as possible so that the lateral forces will be reliably taken up. The configuration of the bearing pattern is different for each piston. The occurrence of mixed friction between the piston and the sliding surface of the cylinder will increase the friction loss. In those regions of the piston skirt which do not directly take up lateral forces but owing to the ovalness of the piston skirt move close to the sliding surface of the cylinder, additional friction losses are caused by shearing forces in the lubricating film formed between the piston and the sliding surface of the cylinder.

The total friction loss caused by the friction of the piston skirt amounts to up to 15% of the total friction occuring in the internal combustion engine. For this reason a reduction of the friction loss by a reduction of the load-carrying surfaces of the piston skirt will increase the power of the internal combustion engine or will reduce its fuel consumption. For instance, Published German Application No. 32 28 982 discloses a piston which in the regions disposed on both sides of the plane which contains the piston axis and the direction that is at right angles to the piston axis is in contact with the sliding surface of the cylinder only on one relatively small bearing surface or on a plurality of separate, relatively small bearing surfaces. The marginal regions of said bearing surfaces are so designed that the lubricant is conducted toward the associated bearing surface and between the piston and the sliding surface of the cylinder. But that design involves a higher pressure per unit of area under full load, and this is accompanied by wear and involves a risk of seizure because there are no reserve contact surface areas. The motion of the piston is also adversely affected because there is no uniform rolling movement of the contact surface of the piston in the cylinder during the change of the contact surface of the piston in the cylinder. This fact has also an unfavorable effect on the motion of the piston rings so that the internal combustion engine consumes more lubricant.

SUMMARY OF THE INVENTION

It is an object of the invention to provide a light alloy piston which is of the kind described first hereinbefore and in which the friction loss is reduced whereas the other functions of the piston are not adversely affected.

That object is accomplished in that the ovalness of the piston skirt is larger in the region adjacent to the horizontal plane containing the pin axis than in the remaining regions of the piston skirt and the ovalnesses merge continuously into each other. Owing to the larger ovalness, a greatly constricted bearing pattern will be formed adjacent to the horizontal plane which includes the pin axis so that the floating on the lubricating film will be improved and, as a result, the friction loss will be reduced and more favorable sliding conditions will be obtained. Owing to the smaller ovalness at the bottom end of the piston skirt, the bearing pattern is wide in that region so that the deformation of and stresses in the skirt are reduced there. Because the bearing pattern is uninterrupted in the direction of movement in the middle of the piston skirt, a uniform rolling of the piston during the change of contact surfaces is ensured; this results in reduced noise and in a control of the consumption of lubricant. In pistons having diameters of 70 to 100 mm the minor axis of the ovalness of the piston at the top and the lower end of the skirt is about 0.2 to 0.6 mm smaller than the larger axis of ovalness. In the region adjacent to the horizontal plane containing the pin axis the minor axis of the ovalness of the piston is about at least 0.1 mm smaller than the minor axis at the top or lower end of the skirt.

The invention is shown by way of example in the drawings and will be explained more in detail hereinafter.

DETAILED DESCRIPTION OF THE INVENTION

Figure 1:
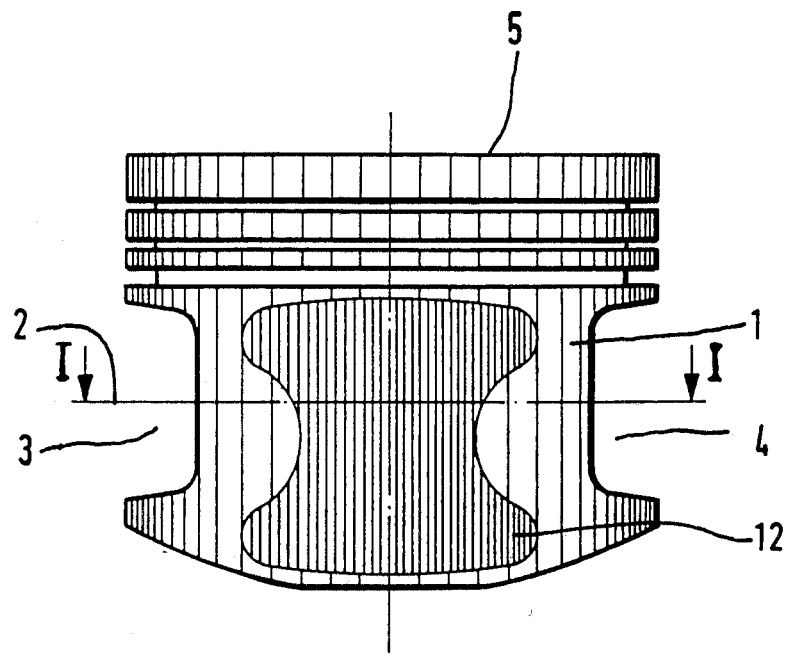
FIG. 1 is a side elevation showing the pressure and backpressure sides of the piston.
Figure 2:
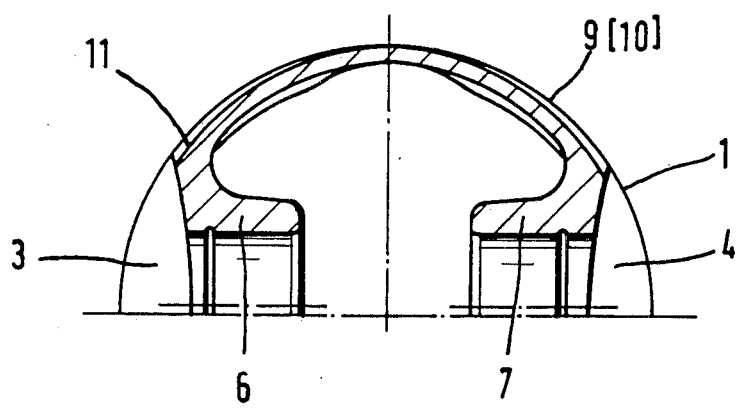
FIG. 2 is a fragmentary transverse sectional view showing the piston of FIG. 1 and taken on the section line I—I corresponding to the plane containing the piston pin axis.
Figure 3:
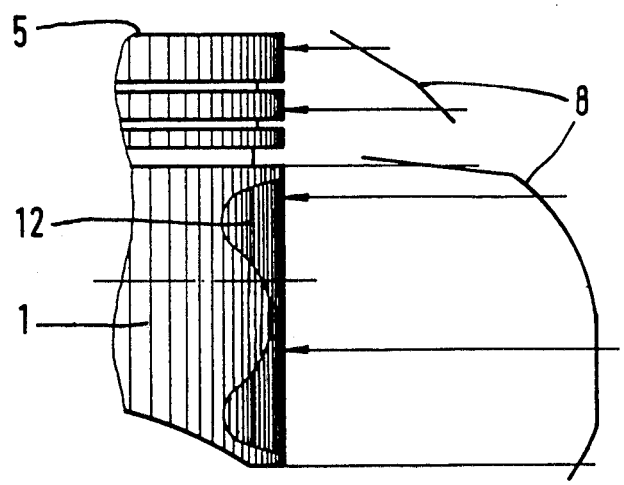
FIG. 3 is a fragmentary side elevation showing the piston viewed from the pin side and the running clearance curve obtained in a cold state.

Referring to FIGS. 1-3, the light alloy piston 5 consists, e.g., of a so-called slipper skirt piston having a skirt 1 which is formed with recesses 3, 4 adjacent to the axis which contains the piston pin axis. The piston 5 has a convex and oval external shape. The piston pin bosses 6, 7 are offset toward the center from the outside surface of the skirt. The cold piston 5 has a convex shape in the cold state because the running clearance line 8 is curved and is more strongly curved near the top end of the skirt 1 than near the lower end of the skirt. The skirt 1 has a smaller ovalness in its upper and lower end regions 9, 10 than in the region 11 adjacent to the plane 2 which contains the piston pin axis. Owing to that design, the operation of the engine results in the formation of an approximately double-cone-section shaped bearing pattern 12.

In an example of a piston having a diameter of 90 mm measured at right angles to piston pin axis and incorporating the present invention the minor axis of ovalness in regions 9 and 10 is about 0.4 mm smaller than the larger axis of ovalness, whilst in region 11 the minor axis of ovalness is about 0.6 mm smaller than the larger axis of ovalness of the piston.

What is claimed is:

1. In a light alloy piston for internal combustion engines, wherein the piston has bosses for a piston pin having a pin axis and a convex external shape from top to bottom and an oval external shape therearound and comprises a skirt which in the cold state has a larger running clearance at its top end than at its bottom end, the improvement wherein: the ovalness of the piston has a minor axis parallel to the pin axis and a major axis perpendicular thereto, the ovalness of the piston skirt is larger in the region adjacent to the horizontal plane containing the pin axis than in the remaining regions of the piston skirt and the ovalnesses merge continuously into each other.

* * * * *